(No Model.)
J. M. ISENBERG.
GRIPPING DEVICE FOR CARS FOR INCLINED RAILWAYS.
No. 437,993. Patented Oct. 7, 1890.
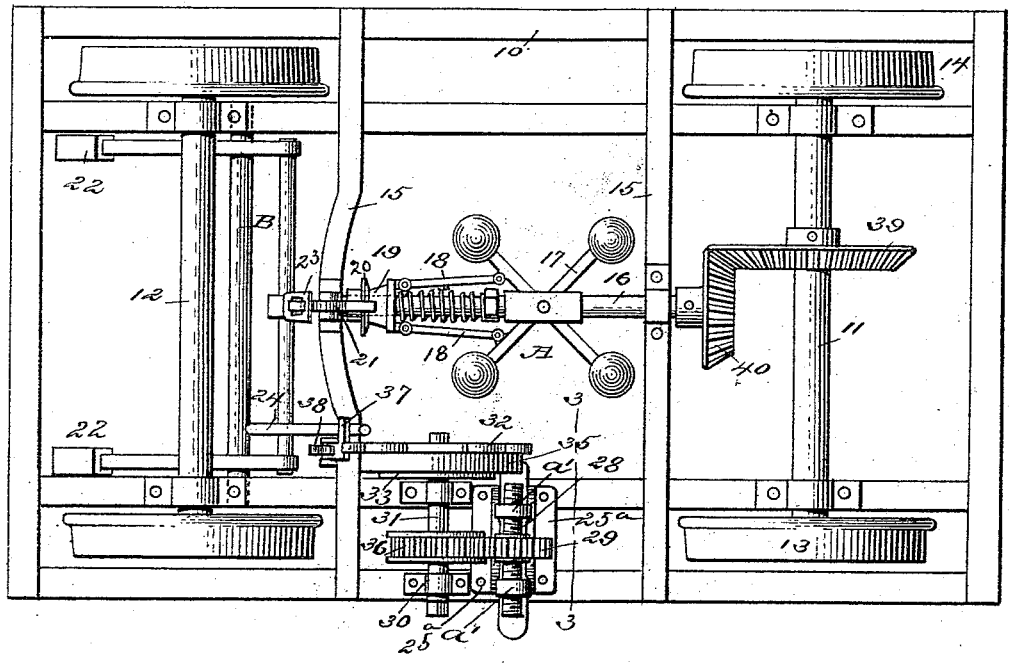
Fig. 1.
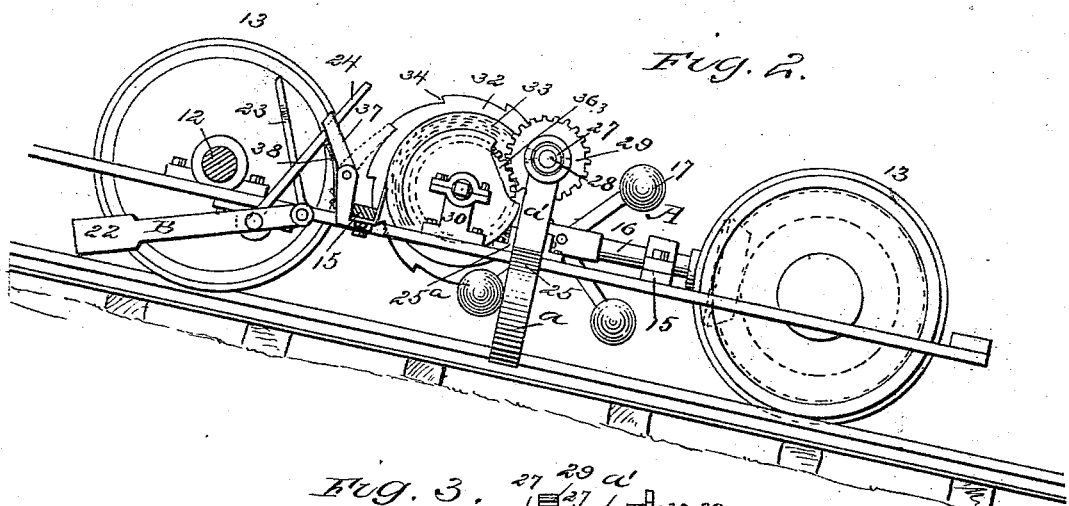
Fig. 2.
Fig. 3.
WITNESSES:
W. R. Davis.
C. Sedgwick
INVENTOR:
J. M. Isenberg
BY Munn & Co.
ATTORNEYS

UNITED STATES PATENT OFFICE.

JACOB M. ISENBERG, OF MINES, PENNSYLVANIA, ASSIGNOR OF ONE-HALF TO SAMUEL B. ISENBERG, OF SAME PLACE.

GRIPPING DEVICE FOR CARS FOR INCLINED RAILWAYS.

SPECIFICATION forming part of Letters Patent No. 437,993, dated October 7, 1890.

Application filed March 21, 1890. Serial No. 344,814. (No model.)

*To all whom it may concern:*

Be it known that I, JACOB MILLER ISENBERG, of Mines, in the county of Blair and State of Pennsylvania, have invented a new and useful Gripping Device for Cars for Inclined Railways, of which the following is a full, clear, and exact description.

My invention relates to a gripping device for use upon cars traveling upon inclined railways, and has for its object to provide mechanism which will grip the rails the moment that the car travels faster than a predetermined speed; and a further object of the invention is to provide a mechanism simple, durable, and positive in action and capable of convenient application to any car body or truck.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the invention applied to the body of a truck or frame of a car. Fig. 2 is a side elevation thereof, partly in section, the car being illustrated upon a track and the grip as clamping a rail thereof; and Fig. 3 is a transverse section on line 3 3 of Fig. 1.

The frame 10 is supported by a forward axle 11 and rear axle 12, said axles being provided with the usual form of wheels 13. Ordinarily the end bars of the frame are made to project beyond the side bars proper and are connected by outer or auxiliary side bars, whereby a boxing 14 is formed, in which the wheels revolve, and at each side of the center of the frame a cross-bar 15 is located, which cross-bars are attached to both the inner and the outer side bars of the frame, as illustrated in the plan view in Fig. 1.

Longitudinally in the frame in the cross-bars 15 a governor A is held to revolve, comprising a spindle 16, in which two crossed weighted arms 17 are pivoted, the said arms being connected by links 18 with a spring-pressed sleeve 19, held to slide upon the spindle at the rear end of the same. This sleeve 19 at its rear end is provided with a flange 20, having a beveled forward face. The flange of the sleeve is adapted for contact with an angled latch 21, mounted upon the rear cross-bar 15, the head of which latch is at its rear end, and beneath the rear axle of the frame an essentially U-shaped cradle B is pivoted, the extremities of the members of which extend rearward and are weighted, as illustrated at 22 in Fig. 1.

The cradle is provided with two cross-bars, the rear cross-bar being carried through the sides to form the pivot of the cradle, and upon the forward cross-bar a vertically-extending arm 23 is attached, having an opening in its top to receive the head of the angled latch 21, whereby the said arm acts in the nature of a keeper, and at one side of the center of the rear cross-bar of the cradle an upwardly and forwardly extending rod or bar 24 is secured.

In a chair 25ª, secured to one of the outer and inner side bars of the frame between the cross-bars 15, two gripping-arms 25 are pivoted, the said gripping-arms being made essentially in the form of tongs, consisting of lower curved members *a* and upper shank members *a'*. The lower members are curved in direction of each other, and their ends are provided with an angular or U shaped recess 26, as best shown in Fig. 3. These lower curved members extend down a sufficient distance below the frame so that when in their normal position one arm of the gripping device will be at each side of the rail upon which the wheels of the car are traveling, and the lower members *a* are of such a length that when the grip is to be secured upon the rail the recessed ends of the lower members will contact with opposite sides of the rail.

The upper members *a'* of the sections of the gripping device are inclined transversely of the frame in opposite directions, and in the upper end of each shank member *a'* a nut 27 is pivoted, the nut of one shank member being provided with a right-hand thread and the nut of the opposite member with a left-hand thread, and in the two nuts the extremities of a transverse right and left hand threaded rod 28 are screwed, the said rod having secured thereon at or near its center a pinion 29.

In suitable brackets 30, projected upward from the inner and outer side bars of the frame, preferably at the rear of the cradle in which the gripping device is pivoted, a shaft 31 is held to revolve, the ends whereof project beyond the said brackets, and the outer extremity of said shaft is preferably squared to receive a suitable key.

Upon the inner extending extremity of the shaft an outer disk 32 and an inner disk 33 are secured, the outer disk being the larger and provided with a ratchet peripheral surface 34. The inner disk is simply a guard-disk, and between the two disks a spring 35 is coiled upon the shaft, one end of which spring is secured to the shaft and the other end to the rear cross-bar 15, or to any other convenient portion of the frame. Between the brackets the said shaft 31 is provided with an attached pinion 36, which is usually provided upon each side face with a guard-disk, the pinion upon the shaft 31 being adapted to mesh with the pinion upon the threaded rod of the gripping device.

Immediately at the rear of the ratchet-disk an angled pawl 37 is pivoted to the frame, which pawl is normally held in connection with the ratchet-surface of the disk 32 by a spring 38.

The governor having been set so that the arms will approach one another after the car has attained more than a predetermined speed, the forward end of the angled latch 21 is made to engage with the beveled surface of the flange 20 of the governor-sleeve, and the keeper 23 of the cradle B is placed in engagement with the head of the said latch. The cradle is thereupon held in a horizontal position, and the rod 24, which is a trip-rod, is forward of the horizontal arm of the pawl 37. The shaft 31 is turned by means of a key or otherwise until the spring 35 has been tightly coiled or wound upon the said shaft, and the spring is held in this coiled position by the pawl 37 engaging with a convenient tooth upon the periphery of the ratchet-disk 32. When the spring is thus wound up, the gears 29 and 36 act to revolve the right and left hand threaded rod 28 and draw the shank members of the gripping device toward one another, whereby the lower curved members are carried away from each other and quite a distance at each side of the track.

In the event that anything should happen to the brakes of the car and the car should attain a speed greater than that previously decided upon, the arms of the governor approach one another, whereby the sleeve of the governor is drawn forward, and the forward member of the latch is freed from contact with the sleeve, whereupon the weights of the cradle act and disengage the keeper from the latch-head, and when this is accomplished the members of the cradle assume the inclined position shown in Fig. 2, which draws the trip-rod 24 rearward, and as said trip-rod passes to the rear it disengages the pawl 37, which is in its path, from contact with the ratchet-disk 32, whereupon the shaft 31 is released from restraint and the spring uncoils, revolving said shaft in a direction contrary to that in which it turns when wound, whereupon the action of the gears 29 and 36 is such as to compel the right and left hand threaded rod 28 to quickly force the shank-members of the gripping device outward in opposite directions, thereby bringing the lower curved members to a firm and positive contact with the track and arresting the further progress of the car.

The action of the gripping device in practice is almost simultaneous with the release of the cradle B, and it will be understood that if in practice it is found desirable a gripping device similar to that described may be located at each side of a car instead of at one side only, as illustrated, in which event the cradle B is provided with two trip-bars.

The governor A is actuated, preferably from the forward axle, by means of a bevel-gear 39, secured upon said axle and meshing with a bevel-pinion 40, attached to the spindle of the governor.

Having thus described my invention, I claim as new and desire to secure by Letters Patent—

1. The combination, with a governor, a cradle containing a trip-bar, and a latch device connecting the governor and cradle, of pivoted gripping-arms comprising curved lower members and outwardly-extending shank members, a right and left hand threaded rod engaging with the shank members of the gripping-arms, a spring-controlled shaft, and mechanism, substantially as shown and described, for actuating the threaded rod of the gripping-arms from the spring-controlled shaft and cradle, substantially as specified.

2. The combination, with a governor, a cradle, a latch engaging the governor, and a keeper attached to the cradle and adapted for contact with the latch, of pivotally-connected gripping-arms, each comprising a lower curved member and an outwardly and upwardly extending shank member, nuts pivoted in the shank members, a right and left hand threaded rod engaging the said nuts, a spring-actuated shaft, a ratchet and pawl controlling said shaft, a gear-connection between the spring-shaft and the threaded rod, and a trip-bar attached to the cradle and adapted for contact with the said pawl, substantially as shown and described, and for the purpose specified.

3. The combination, with a governor, an essentially U-shaped cradle having its members weighted, a latch engaging the governor, and a keeper attached to the cradle and adapted for contact with the latch, of pivotally-connected gripping-arms, each comprising a lower curved member and an outwardly and upwardly extending shank member, nuts pivoted in the shank members, a right and left hand threaded rod engaging the said nuts, a spring-actuated shaft, a ratchet and pawl controlling said shaft, a gear-connection between the spring-shaft and the threaded rod, and a trip-bar attached to the cradle and adapted for contact with the said pawl, substantially as shown and described, and for the purpose specified.

JACOB M. ISENBERG.

Witnesses:
  A. B. GOOD,
  S. B. ISENBERG.